US011978408B2

(12) United States Patent
Wang et al.

(10) Patent No.: US 11,978,408 B2
(45) Date of Patent: May 7, 2024

(54) BACKLIGHT UNIT, CONTROL METHOD THEREOF, AND LIQUID CRYSTAL DISPLAY DEVICE

(71) Applicant: TCL China Star Optoelectronics Technology Co., Ltd., Shenzhen (CN)

(72) Inventors: Fuyi Wang, Shenzhen (CN); Fengcheng Xu, Shenzhen (CN); Qingsheng Lan, Shenzhen (CN); Jinfeng Liu, Shenzhen (CN)

(73) Assignee: TCL China Star Optoelectronics Technology Co., Ltd., Shenzhen (CN)

( * ) Notice: Subject to any disclaimer, the term of this patent is extended or adjusted under 35 U.S.C. 154(b) by 0 days.

(21) Appl. No.: 16/960,556

(22) PCT Filed: Jun. 5, 2020

(86) PCT No.: PCT/CN2020/094599

§ 371 (c)(1),
(2) Date: Jul. 8, 2020

(87) PCT Pub. No.: WO2021/217787

PCT Pub. Date: Nov. 4, 2021

(65) Prior Publication Data

US 2023/0094046 A1 Mar. 30, 2023

(30) Foreign Application Priority Data

Apr. 26, 2020 (CN) ......................... 202010340008.8

(51) Int. Cl.

*G09G 3/34* (2006.01)
*G09G 3/20* (2006.01)
*G09G 3/36* (2006.01)

(52) U.S. Cl.

CPC ........... *G09G 3/342* (2013.01); *G09G 3/2022* (2013.01); *G09G 3/36* (2013.01); *G09G 2320/064* (2013.01)

(58) Field of Classification Search

CPC ........ G09G 3/342; G09G 3/2022; G09G 3/36; G09G 2320/064

See application file for complete search history.

(56) References Cited

U.S. PATENT DOCUMENTS

2003/0016190 A1 1/2003 Kondo
2003/0193451 A1 10/2003 Kimura
(Continued)

FOREIGN PATENT DOCUMENTS

CN 1674072 A 9/2005
CN 1763819 A 4/2006
(Continued)

OTHER PUBLICATIONS

Research on Subfield Control Technology of Passive OLED with 256 Gray Level.

*Primary Examiner* — Joseph R Haley
*Assistant Examiner* — Jennifer L Zubajlo
(74) *Attorney, Agent, or Firm* — Nathan & Associates; Menachem Nathan

(57) ABSTRACT

A backlight unit, a control method thereof, and a liquid crystal display device are provided. The control method includes following steps: obtaining backlight data corresponding to each of the partitions, the backlight data including multiple bits of data; dividing a frame of a lighting process of each light-emitting unit of the partitions into a plurality of sub-fields having different durations, wherein each of the sub-fields corresponds to one of the bits of data; and outputting the sub-fields having different durations corresponding to each of the partitions in a preset order.

12 Claims, 4 Drawing Sheets

(56) References Cited

U.S. PATENT DOCUMENTS

| | | | | |
|---|---|---|---|---|
| 2005/0212729 | A1 | 9/2005 | Chung et al. | |
| 2006/0082525 | A1* | 4/2006 | Suzuki | G09G 3/2025 345/77 |
| 2010/0073406 | A1 | 3/2010 | Shishido et al. | |
| 2013/0050305 | A1 | 2/2013 | Yoshinaga et al. | |
| 2013/0076802 | A1* | 3/2013 | Yoshinaga | G09G 3/2022 345/690 |
| 2015/0109286 | A1* | 4/2015 | Verbeure | G09G 3/3406 345/545 |
| 2020/0211481 | A1* | 7/2020 | Lee | G09G 3/3648 |
| 2021/0337642 | A1* | 10/2021 | Wang | G09G 3/3426 |

FOREIGN PATENT DOCUMENTS

| | | | |
|---|---|---|---|
| CN | 1773594 | A | 5/2006 |
| CN | 1858838 | A | 11/2006 |
| CN | 102968948 | A | 3/2013 |
| CN | 103021310 | A | 4/2013 |
| CN | 110517630 | A | 11/2019 |
| JP | 2001117534 | A | 4/2001 |

* cited by examiner

201

BACKLIGHT UNIT, CONTROL METHOD THEREOF, AND LIQUID CRYSTAL DISPLAY DEVICE

FIELD OF INVENTION

The present application relates to the field of display technologies, in particular to a backlight unit, a control method thereof, and a liquid crystal display device.

BACKGROUND OF INVENTION

With vigorous development of an information society, people's demand for information displays has become more and more urgent and extensive, and requirements have become more and more stringent. Display technology of the panel industry has developed rapidly since the 1990s and has gradually matured. Due to advantages of high definition, good image color, power saving, light weight and thinness, and portability, flat panel displays have become widely used in the abovementioned information display products and have broad market prospects. As driving technology of the panel industry matures, opportunities and challenges will follow. Due to backlights of liquid crystal display devices having limitations such as having high power consumption and a low contrast ratio, the backlight is forced to develop in a direction of portion controllability (local dimming).

Traditional micro light-emitting diode (Mini-LED) backlights use static driving scheme or a passive matrix (PM) driving scheme to achieve local dimming of the backlight. Since each region needs to be controlled separately by a data line and the number of backlight partitions is generally under 2000 partitions, too many driving chips are required, which results in high product costs.

Therefore, there is a need to find a cost-reducing technical solution in order to see actual mass-produced products on the market.

SUMMARY OF INVENTION

Technical Problem

The purpose of the present application is to provide a backlight unit and a control method thereof, and a liquid crystal display device, so that the backlight unit can adjust brightness of the backlight in partitions, reducing power consumption and cost, and improving a display contrast ratio of liquid crystal display devices.

Technical Solution

In order to achieve the above objects, the present application provides a control method of a backlight unit, the backlight unit including a plurality of partitions, each of the partitions arranged with a light-emitting unit, wherein the control method includes following steps:

- obtaining backlight data corresponding to each of the partitions, the backlight data including multiple bits of data;
- dividing a frame of a lighting process of each light-emitting unit of the partitions into a plurality of sub-fields having different durations, wherein each of the sub-fields corresponds to one of the bits of data; and
- outputting the sub-fields having different durations corresponding to each of the partitions in a preset order.

In the aforementioned control method of the backlight unit, the backlight data includes data from a 0-th bit to an (N−1)-th bit, and the step of dividing the frame of the lighting process of each light-emitting unit of the partitions into the plurality of sub-fields having different durations includes following step:

- dividing the frame of the lighting process of each light-emitting unit of the partitions into N sub-fields having different durations, wherein a ratio of a duration of an i-th sub-field to a total duration of the N sub-fields is $2^{i-1}/2^N$, the i-th sub-field corresponds to data of an (i−1)-th bit, where i is an integer greater than or equal to 1 and less than or equal to N, and N is an integer greater than or equal to 2.

In the aforementioned control method of the backlight unit, in the step of outputting the sub-fields having different durations corresponding to each of the partitions in the preset order includes following step:

- outputting a first sub-field to an N-th sub-field sequentially, wherein in the i-th sub-field, the light-emitting unit inputs the data of the (i−1)-th bit corresponding to the i-th sub-field once, and outputs the i-th sub-field; and
- wherein data from the 0-th bit to the (N−1)-th bit is 0 or 1, when the data of the (i−1)-th bit is 1, the duration of the light-emitting unit corresponding to the i-th sub-field is in a light-emitting state; when the data of the (i−1)-th bit is 0, the duration of the light-emitting unit corresponding to the (i−1)-th sub-field is in a dark state.

In the aforementioned control method of the backlight unit, each the light-emitting unit includes a charging unit, a driving unit, an energy storage unit, and a plurality of light-emitting elements connected in series, wherein

- the charging unit is electrically connected to the driving unit and the energy storage unit, and is configured to write a data signal to the energy storage unit according to a scan signal;
- the driving unit is electrically connected to the energy storage unit and the light-emitting elements connected in series, and is configured to drive the light-emitting elements connected in series to operate under a control of the energy storage unit; and
- the energy storage unit is configured to store the data signal and control an operation of the driving unit according to the data signal.

In the aforementioned control method of the backlight unit, the step of obtaining backlight data corresponding to each of the partitions includes following step:

- obtaining the backlight data of each of the partitions from a time controller or a field programmable gate array.

A backlight unit, including a plurality of partitions, each of the partitions arranged with a light-emitting unit, wherein the backlight unit includes:

- an obtaining unit configured to obtain backlight data corresponding to each of the partitions, the backlight data including multiple bits of data;
- a dividing unit configured to divide a frame of a lighting process of each light-emitting unit of the partitions into a plurality of sub-fields having different durations, wherein each of the sub-fields corresponds to one of the bits of data; and
- an output unit configured to output the sub-fields having different durations corresponding to each of the partitions in a preset order.

In the aforementioned backlight unit, the dividing unit is configured to divide the frame of the lighting process of each light-emitting unit of the partitions into N sub-fields having different durations, wherein a ratio of a duration of an i-th sub-field to a total duration of the N sub-fields is $2^{i-1}/2^N$, the backlight data includes data from a 0-th bit to an (N−1)-th bit, the i-th sub-field corresponds to data of an (i−1)-th bit, where i is an integer greater than or equal to 1 and less than or equal to N, and N is an integer greater than or equal to 2.

In the aforementioned backlight unit, the output unit is configured to output a first sub-field to an N-th sub-field sequentially, wherein in the i-th sub-field, the light-emitting unit inputs the data of the (i−1)-th bit corresponding to the i-th sub-field once, and outputs the i-th sub-field; and

- wherein data from the 0-th bit to the (N−1)-th bit is 0 or 1, when the data of the (i−1)-th bit is 1, the duration of the light-emitting unit corresponding to the i-th sub-field is in a light-emitting state; when the data of the (i−1)-th bit is 0, the duration of the light-emitting unit corresponding to the (i−1)-th sub-field is in a dark state.

In the aforementioned backlight unit, each the light-emitting unit includes a charging unit, a driving unit, an energy storage unit, and a plurality of light-emitting elements connected in series, wherein

- the charging unit is electrically connected to the driving unit and the energy storage unit, and is configured to write a data signal to the energy storage unit according to a scan signal;
- the driving unit is electrically connected to the energy storage unit and the light-emitting elements connected in series, and is configured to drive the light-emitting elements connected in series to operate under a control of the energy storage unit; and
- the energy storage unit is configured to store the data signal and control an operation of the driving unit according to the data signal.

In the present embodiment, the obtaining unit is configured to obtain the backlight data of each of the partitions from a time controller or a field programmable gate array.

A liquid crystal display device, the liquid crystal display device including a backlight unit, the backlight unit including a plurality of partitions, each of the partitions arranged with a light-emitting unit, wherein the backlight unit includes:

- an obtaining unit configured to obtain backlight data corresponding to each of the partitions, the backlight data including multiple bits of data;
- a dividing unit configured to divide a frame of a lighting process of each light-emitting unit of the partitions into a plurality of sub-fields having different durations, wherein each of the sub-fields corresponds to one of the bits of data; and
- an output unit configured to output the sub-fields having different durations corresponding to each of the partitions in a preset order.

In the aforementioned liquid crystal display device, the dividing unit is configured to divide the frame of the lighting process of each light-emitting unit of the partitions into N sub-fields having different durations, wherein a ratio of a duration of an i-th sub-field to a total duration of the N sub-fields is $2^{i-1}/2^N$, the backlight data includes data from a 0-th bit to an (N−1)-th bit, the i-th sub-field corresponds to data of an (i−1)-th bit, where i is an integer greater than or equal to 1 and less than or equal to N, and N is an integer greater than or equal to 2.

In the aforementioned liquid crystal display device, the output unit is configured to output a first sub-field to an N-th sub-field sequentially, wherein in the i-th sub-field, the light-emitting unit inputs the data of the (i−1)-th bit corresponding to the i-th sub-field once, and outputs the i-th sub-field; and

- wherein data from the 0-th bit to the (N−1)-th bit is 0 or 1, when the data of the (i−1)-th bit is 1, the duration of the light-emitting unit corresponding to the i-th sub-field is in a light-emitting state; when the data of the (i−1)-th bit is 0, the duration of the light-emitting unit corresponding to the (i−1)-th sub-field is in a dark state.

In the aforementioned liquid crystal display device, each the light-emitting unit includes a charging unit, a driving unit, an energy storage unit, and a plurality of light-emitting elements connected in series, wherein

- the charging unit is electrically connected to the driving unit and the energy storage unit, and is configured to write a data signal to the energy storage unit according to a scan signal;
- the driving unit is electrically connected to the energy storage unit and the light-emitting elements connected in series, and is configured to drive the light-emitting elements connected in series to operate under a control of the energy storage unit; and
- the energy storage unit is configured to store the data signal and control an operation of the driving unit according to the data signal.

In the aforementioned liquid crystal display device, the obtaining unit is configured to obtain the backlight data of each of the partitions from a time controller or a field programmable gate array.

Beneficial Effect

The present application provides a backlight unit, a control method thereof, and a liquid crystal display device. The backlight unit includes a plurality of partitions, each of the partitions is arranged with a light-emitting unit, wherein the control method includes following steps: obtaining backlight data corresponding to each of the partitions, the backlight data including multiple bits of data; dividing a frame of a lighting process of each light-emitting unit of the partitions into a plurality of sub-fields having different durations, wherein each of the sub-fields corresponds to one of the bits of data; and outputting the sub-fields having different durations corresponding to each of the partitions in a preset order. The present application proposes the control method of the backlight unit based on an active control method, which controls brightness of light emitted by the light-emitting unit of each partition of the backlight unit based on an unequal sub-field, and divides a frame of a lighting process of one backlight partition into N parts, each part is called a sub-field, and the N sub-fields are output in a preset order, using a cumulative effect of viewing angle brightness to achieve different brightness of different partitions of the backlight unit. Adjusting the backlight brightness by partitions can reduce power consumption of the backlight unit and improving the contrast ratio of the liquid crystal display devices during display. The use of active control can reduce control signals, thereby achieving cost reduction.

DETAILED DESCRIPTION OF EMBODIMENTS

In order to illustrate the technical solutions of the present application or the related art in a clearer manner, the drawings desired for the present application or the related art will be described hereinafter briefly. Obviously, the following drawings merely relate to some embodiments of the present application, and based on these drawings, a person skilled in the art may obtain the other drawings without any creative effort.

Figure 1:
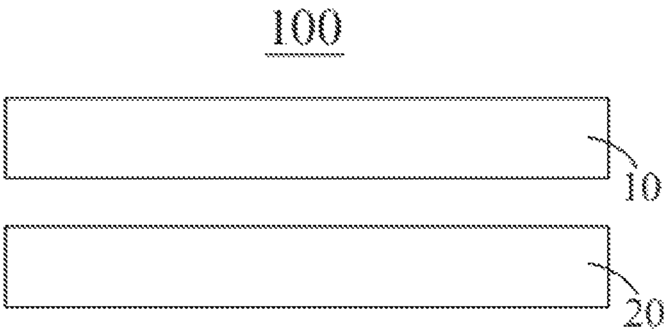
FIG. 1 is a schematic diagram of a liquid crystal display device according to an embodiment of the present application.

As shown in FIG. 1, a schematic diagram of a liquid crystal display device according to an embodiment of the present application the liquid crystal display device 100 includes a liquid crystal display panel 10 and a backlight unit 20. The liquid crystal display panel 10 is disposed opposite to the backlight unit 20. The backlight unit 20 is configured to emit light in partitions, and a brightness of lights emitted from different partitions are independently controlled. The liquid crystal display panel 10 is configured to receive the light emitted from different partitions of the backlight unit 20 and display images. The backlight unit 20 controls the brightness of the light of each partition of the backlight unit based on an unequal sub-field, which can reduce power consumption of the backlight unit 20 and increase a contrast ratio of the liquid crystal display panel 10 during display. The use of an active control method, active matrix (AM), can reduce control signals, thereby reducing costs.

Figure 2:
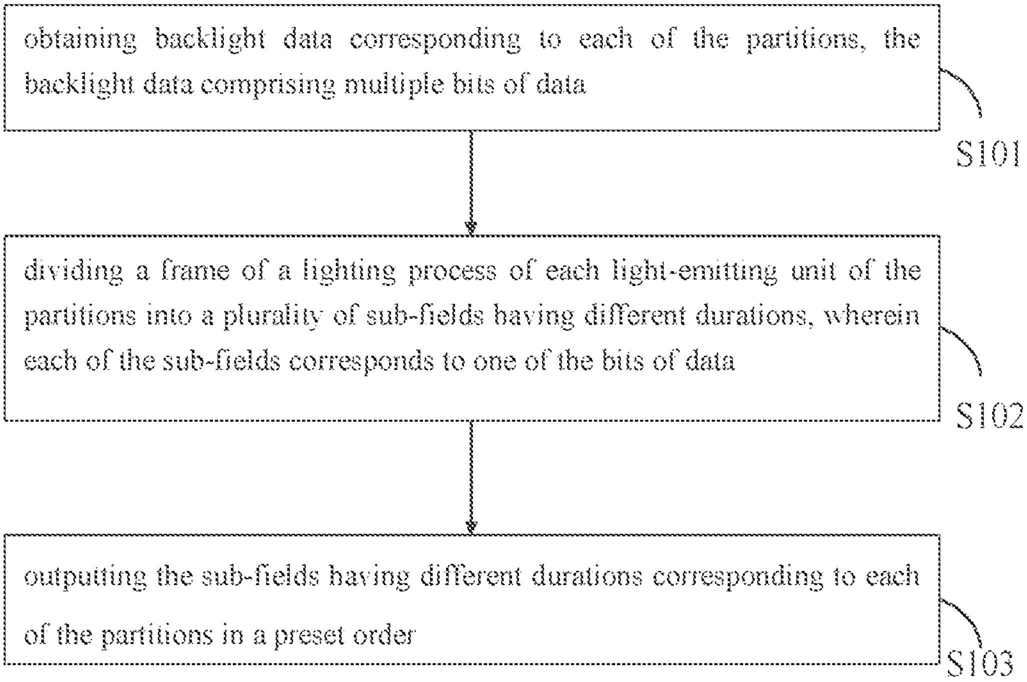
FIG. 2 is a flowchart of a control method of a backlight unit shown in FIG. 1.

As shown in FIG. 2, a flowchart of a control method of the backlight unit shown in FIG. 1, the backlight unit 20 includes a plurality of partitions, and each partition is arranged with a light-emitting unit. The control method of the backlight unit includes steps as follows.

S101, obtaining backlight data corresponding to each of the partitions, the backlight data including multiple bits of data.

Specifically, the backlight data of each partition is obtained from a time controller (TCON) or a field programmable gate array (FPGA). The backlight data of each partition is obtained through an algorithm process based on data information of an image to be displayed. The backlight data include data from a 0-th bit to an (N−1)-th bit, wherein data from the 0-th bit to the (N−1)-th bit is 0 or 1. The 0-th bit is the lowest bit, and the (N−1)-th bit is the highest bit.

Each backlight unit 20 can emit light with different brightness levels. For example, when a grayscale level of the backlight unit 20 is 7 bits, the backlight unit 20 can emit 128 different brightness levels, that is, the brightness levels correspond to 0-127 grayscale levels. When the grayscale level of the backlight unit 20 is 8 bits, the backlight unit 20 can emit 256 different brightness levels. When the grayscale level of the backlight unit 20 is 10 bits, the backlight unit 20 can emit 1024 different brightness levels.

One backlight unit 20 can consist of one backlight module, or can consist of a plurality of independently controlled backlight modules. Each backlight unit 20 includes a plurality of partitions. Each partition is provided with a same number of inorganic light-emitting diodes connected in series. The inorganic light-emitting diode is a micro light-emitting diode (Mini-LED). The inorganic light-emitting diodes include red light inorganic light-emitting diodes, blue light inorganic light-emitting diodes, and green light inorganic light-emitting diodes. The inorganic light-emitting diodes can also include a white light inorganic light-emitting diode.

Each backlight unit 20 also includes a plurality of parallel scan lines and a plurality of parallel data lines. The scan lines are insulated from the data lines and intersect perpendicularly. Each light-emitting unit 201 is connected to one scan line and one data line, a same row of light-emitting units 201 is connected to a same scan line, and a same column of light-emitting units 201 is connected to a same data line.

Figure 3:
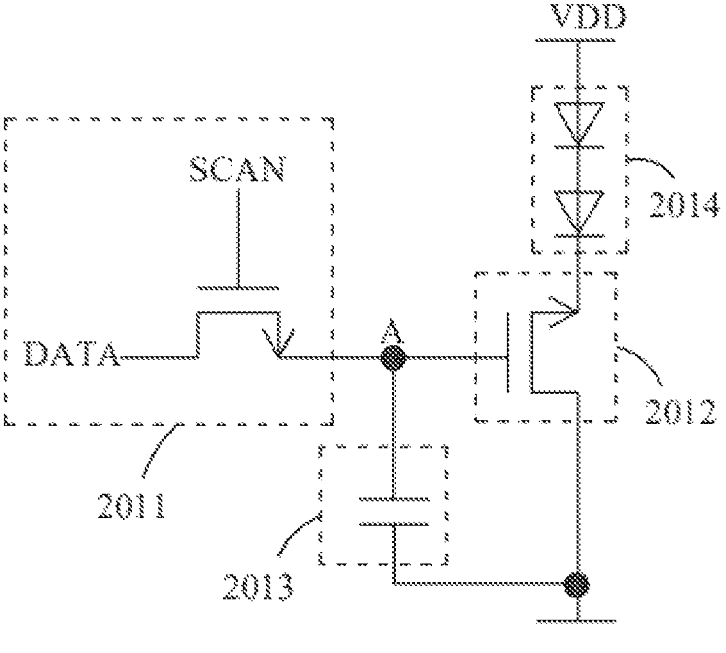
FIG. 3 is a schematic diagram of a light-emitting unit of a backlight unit according to an embodiment of the present application.

As shown in FIG. 3, it is a schematic diagram of a light-emitting unit of the backlight unit according to an embodiment of the present application. Each light-emitting unit 201 includes a charging unit 2011, a driving unit 2012, an energy storage unit 2013, and a plurality of light-emitting elements 2014 connected in series.

The charging unit 2011 is electrically connected to the driving unit 2012 and the energy storage unit 2013, and is configured to write a data signal to the energy storage unit 2013 according to a scan signal.

The driving unit 2012 is electrically connected to the energy storage unit 2013 and the light-emitting elements 2014 connected in series, and is configured to drive the light-emitting elements 2014 connected in series to operate under a control of the energy storage unit 2013.

The energy storage unit 2013 is configured to store data signals, and controls the driving unit 2012 to operate according to the data signals.

The charging unit 2011 is a first thin film transistor, the driving unit 2012 is a second thin film transistor, and the energy storage unit 2013 is a capacitor. The light-emitting elements 2014 connected in series include micro light-emitting diodes. A gate of the first thin film transistor is connected to the scan line, a first end of the first thin film transistor is connected to the data line, and a second end of the first thin film transistor is connected to a gate of the second thin film transistor. The gate of the second thin film transistor is connected to the second end of the first thin film transistor and a first end of the capacitor, a first end of the second thin film transistor is connected to the light-emitting elements 2014 connected in series, a second end of the second thin film transistor is connected to a second power terminal VSS. An end of the light-emitting elements 2014 connected in series is connected to a first power terminal VDD, and another end is connected to the first end of the second thin film transistor. The first power terminal VDD is configured to input a high-level direct current (DC) voltage, and the second power terminal VSS is a ground terminal.

When a voltage corresponding to the data signal is greater than or equal to a turn-on voltage of the second thin film transistor, the second thin film transistor is turned on, and a current flows through the light-emitting elements 2014 connected in series, the light-emitting elements 2014 connected in series emit light, and the light-emitting unit 201 is in a light-emitting state. Due to a coupling effect of the capacitor, a potential of the gate of the second thin film transistor can be maintained for a period of time, and the time when the light-emitting unit 201 is in the light-emitting state can also be maintained for a period of time. When the voltage corresponding to the data signal is less than the turn-on voltage of the second thin film transistor, the second thin film transistor is turned off, the light-emitting elements 2014 connected in series are in an inoperative state, and the light-emitting unit 201 is in a dark state until the gate of the second thin film transistor is written with a data signal greater than the turn-on voltage.

S102, dividing a frame of a lighting process of each light-emitting unit of the partitions into a plurality of sub-fields having different durations, wherein each of the sub-fields corresponds to one of the bits of data.

Specifically, dividing one frame of the lighting process of each light-emitting unit 201 of each partition into N sub-fields having different durations, wherein a ratio of a duration of an i-th sub-field to a total duration of the N sub-fields is $2^{i-1}/2^N$, the i-th sub-field corresponds to data of an (i−1)-th bit, where i is an integer greater than or equal to 1 and less than or equal to N, and N is an integer greater than or equal to 2. The duration of the i-th sub-field is equal to $2^{i-1}/2^N$, M is the time of one frame.

A number of sub-fields of the light-emitting unit 201 of each partition in one frame duration depends on the gray-scale level of the backlight unit 20. When the grayscale level of the backlight unit 20 is seven levels, and the number of sub-fields is seven, and when the grayscale level of the backlight unit 20 is eight levels, the number of sub-fields is eight. The durations of the N sub-fields are different from each other, and each sub-field corresponds to one of the bits of data. The duration of different bits indicates the contribution of different bits to the backlight brightness, that is, weight of different bits. The longer the duration corresponding to each sub-field, the greater the weight.

S103, outputting the sub-fields having different durations corresponding to each of the partitions in a preset order.

Specifically, outputting a first sub-field to an N-th sub-field sequentially, wherein in the i-th sub-field, the light-emitting unit 201 inputs the data of the (i−1)-th bit corresponding to the i-th sub-field once, and outputs the i-th sub-field. Data of the bits are 0 or 1. When the data of the (i−1)-th bit is 1, the duration of the light-emitting unit 201 corresponding to the i-th sub-field is in the light-emitting state; when the data of the (i−1)-th bit is 0, the duration of the light-emitting unit 201 corresponding to the i-th sub-field is in the dark state.

In the i-th sub-field, a scan-on signal is sequentially input to the scan line of each partition, the first thin film transistor of the light-emitting unit 201 is turned on, and the data signal is written to the capacitor. When the voltage corresponding to the data signal is greater than or equal to the turn-on voltage of the second thin film transistor, the light-emitting elements 2014 connected in series are in a light-emitting state, and the light-emitting unit 201 is in the light-emitting state. When the voltage corresponding to the data signal is less than the turn-on voltage of the second thin film transistor, the second thin film transistor is turned off, the light-emitting elements 2014 connected in series is in the inoperative state, and the light-emitting unit 201 is in the dark state. The capacitive coupling effect of the capacitor enables the light-emitting unit 201 to maintain the light-emitting state or the dark state for a duration corresponding to each sub-field. The coupling effect of the capacitor reduces power consumption of the light-emitting unit 201.

The backlight data of each partition of the backlight unit 20 is divided into the sub-fields with different durations, each sub-field corresponds to one of the bits of data, so that different bits of data contribute differently to the backlight brightness, that is, account for weight of the different bits. The cumulative effect of light over time is used to enable the partitions of the backlight unit 20 to emit lights with different brightness. Compared with the conventional technology, the backlight unit has only two states: the light-emitting state and the dark state. The backlight unit 20 of the present application can reduce power consumption and can also increase the contrast ratio of the liquid crystal display device during display. And the use of active control can reduce the control signals, thereby achieving cost reduction. In addition, the coupling effect of the capacitor in the light-emitting unit 201 is used to solve the problem of limited charging time of high-end products with high color saturation and high refresh rate. The capacitor stores electricity and can reduce power consumption.

The control method of the above backlight unit will be described in detail below in conjunction with specific embodiments. Take the backlight unit of 240 Hz, 7 bit grayscale as an example.

For a partition of the backlight unit 20, a front-end time controller TCON or FPGA provides 7-bit data B=0001101, where 1 represents the data of the 0-th bit B[0], and 0 represents the data of a first bit B[1] , 1 represents the data of a second bit B[2], 1 represents the data of a third bit B[3], 0 represents the data of a fourth bit B[4], and 0 represents the data of a fifth bit B[5], and 0 represents the data of a sixth bit B[6].

A time of each frame is 4.16 milliseconds (ms), which is divided into seven parts. The duration of a first sub-field SF1 is 32.5 microseconds (μs), corresponding to the data 1 of the 0-th bit B[0]; the duration of a second sub-field SF2 is twice the duration of the first sub-field SF1, that is 65 μs, corresponding to the data 0 of the first bit B[1]; the duration of a third sub-field SF3 is twice the duration of the second sub-field SF2, that is 130 μs, corresponding to the data 1 of the second bit B[2]; the duration of a fourth sub-field SF4 is 260 μs, corresponding to the data 1 of the third bit B[3]; the duration of a fifth sub-field SF5 is 520 μs, corresponding to the data 0 of the fourth bit B[4]; the duration of a sixth sub-field SF6 is 1.04 ms, corresponding to data 0 of the fifth bit B[5]; and the duration of a seventh sub-field SF7 is 2.08 ms, corresponding to the data 0 of the sixth bit B[6].

Figure 4:
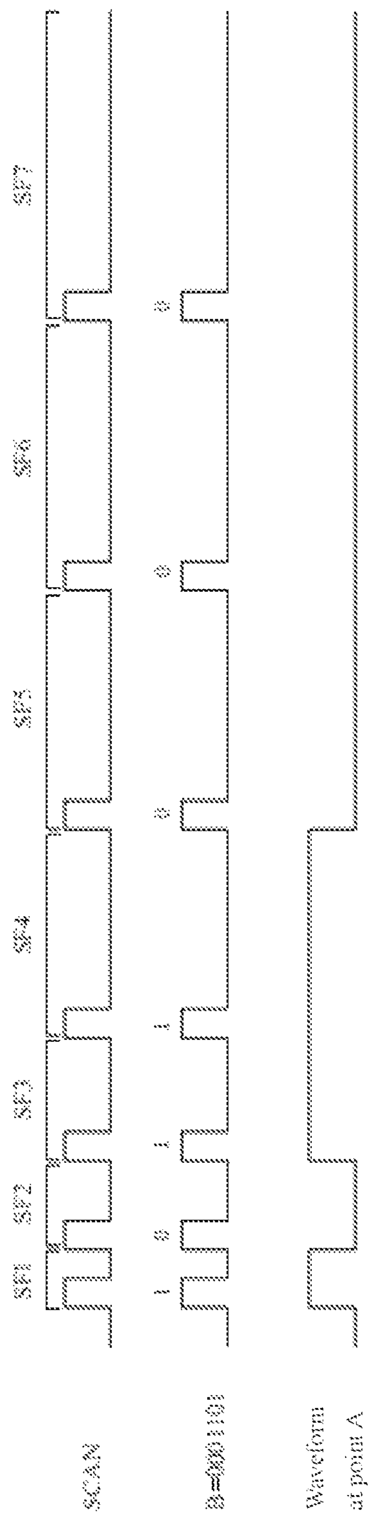
FIG. 4 is a schematic diagram of a principle of an unequal sub-field control of the backlight unit according to an embodiment of the present application.

A schematic diagram of a principle of an unequal sub-field control is shown in FIG. 4. Assuming that an entire backlight unit has eight scan lines (gate lines), a 1G1D architecture is adopted (i.e., a same row of light-emitting units 201 is connected to a same scan line, and a same column of light-emitting units 201 is connected to a same data line), and conducting time of each scan line is 32.5 μs/8=3.8 μs.

The first sub-field SF1 to the seventh sub-field SF7 are sequentially output. Take the output of the first sub-field SF1 and the second sub-field SF2 as an example. For the first sub-field SF1, after the eight scan lines are scanned in order from top to bottom, the data 1 of the 0-th bit B[0] input to each light-emitting unit 201 of each partition to be in the light-emitting state, although conducting time of the gate of the first thin film transistor is only 3.8 μs, but the capacitor in the light-emitting unit 201 has a coupling effect to keep a potential close to 32.5 μs. For the second sub-field SF2, after the eight scan lines are scanned from top to bottom, the second thin film transistor of the light-emitting unit 201 is turned on again, the gate of the first thin film transistor is turned on for a high-level voltage and lasts for 3.8 μs, the data line starts to transfer the data of the first bit B[1] to the light-emitting unit 201 in the partition. A potential of a point A (connecting to a control terminal of the second thin film transistor shown in FIG. 3) is pulled to 0V, and the light-emitting unit 201 is in the dark state. Finally, the state of the driving unit is controlled by the potential at the point A. The brightness from each sub-field SF is cumulative, thereby completing the backlight luminance display of one frame.

The display duration of the bit corresponding to each sub-field SF is increased by a multiple of two, where the 0-th bit corresponds to the first sub-field SF1 and the display duration is 32.5 μs; the first bit corresponds to the second sub-field SF2 and the display duration is 65 μs, the sixth bit corresponds to the seventh sub-field SF7 and the display duration is 2.08 ms, and so on. In this way, the display duration of different bits can indicate the contribution of different bits to brightness of the backlight, that is, the weight of different bits, so as to realize brightness control of a partition.

Figure 5:
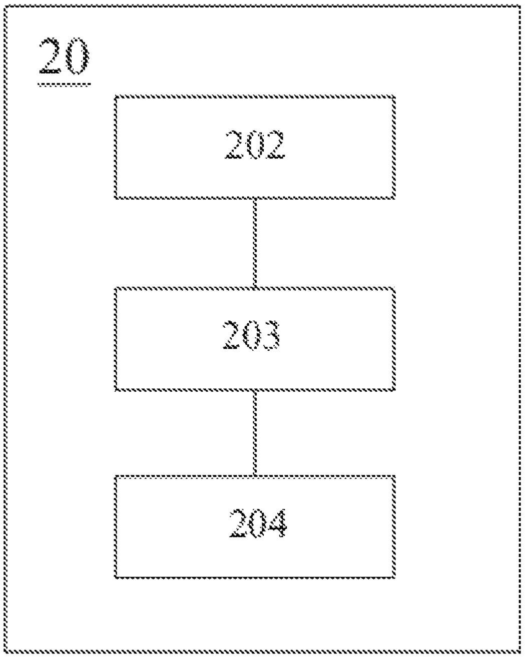
FIG. 5 is a schematic block diagram of the backlight unit according to an embodiment of the present application.

The present application also provides the backlight unit. As shown in FIG. 5, a schematic block diagram of the backlight unit according to an embodiment of the present application, the backlight unit 20 includes:

an obtaining unit 202 configured to obtain backlight data corresponding to each of the partitions, the backlight data including multiple bits of data;

a dividing unit 203 configured to divide a frame of a lighting process of each light-emitting unit of the partitions into a plurality of sub-fields having different durations, wherein each of the sub-fields corresponds to one of the bits of data; and an output unit 204 configured to output the sub-fields having different durations corresponding to each of the partitions in a preset order.

In the present embodiment, the dividing unit 203 is configured to divide the frame of the lighting process of each light-emitting unit of the partitions into N sub-fields having different durations, wherein a ratio of a duration of an i-th sub-field to a total duration of the N sub-fields is $2^{i-1}/2^N$, the backlight data includes data from a 0-th bit to an (N−1)-th bit, the i-th sub-field corresponds to data of an (i−1)-th bit, where i is an integer greater than or equal to 1 and less than or equal to N, and N is an integer greater than or equal to 2.

In the present embodiment, the output unit is configured to output a first sub-field to an N-th sub-field sequentially, wherein in the i-th sub-field, the light-emitting unit inputs the data of the (i−1)-th bit corresponding to the i-th sub-field once, and outputs the i-th sub-field; and wherein data from the 0-th bit to the (N−1)-th bit is 0 or 1, when the data of the (i−1)-th bit is 1, the duration of the light-emitting unit corresponding to the i-th sub-field is in a light-emitting state; when the data of the (i−1)-th bit is 0, the duration of the light-emitting unit corresponding to the (i−1)-th sub-field is in a dark state.

In the present embodiment, each the light-emitting unit includes a charging unit, a driving unit, an energy storage unit, and a plurality of light-emitting elements connected in series, wherein;

the charging unit is electrically connected to the driving unit and the energy storage unit, and is configured to write a data signal to the energy storage unit according to a scan signal;

the driving unit is electrically connected to the energy storage unit and the light-emitting elements connected in series, and is configured to drive the light-emitting elements connected in series to operate under a control of the energy storage unit; and the energy storage unit is configured to store the data signal and control an operation of the driving unit according to the data signal.

In the present embodiment, the obtaining unit is configured to obtain the backlight data of each of the partitions from a time controller or a field programmable gate array.

Descriptions of above embodiments are only used to help understand technical solutions and core ideas of the application. A person skilled in the art can make various modifications and changes to the above embodiments without departing from the technical idea of the present invention, and such variations and modifications are intended to be within the scope of the invention.

What is claimed is:

1. A control method of a backlight unit, the backlight unit comprising a plurality of partitions and each of the partitions arranged with a light-emitting unit, wherein the control method comprises following steps:

obtaining backlight data corresponding to each of the partitions, the backlight data comprising multiple bits of data;

dividing a frame of a lighting process of each light-emitting unit of the partitions into a plurality of sub-fields each having a different duration, wherein each of the sub-fields corresponds to one of the bits of data; and outputting the sub-fields having different durations corresponding to each of the partitions in a preset order;

wherein the backlight data comprises data from a 0-th bit to an (N−1)-th bit, and the step of dividing the frame of the lighting process of each light-emitting unit of the partitions into the plurality of sub-fields each having different durations comprises a following step: dividing the frame of the lighting process of each light-emitting unit of the partitions into N sub-fields having different durations, wherein a ratio of a duration of an i-th sub-field to a total duration of the N sub-fields is $2^{i-1}/(2^N-1)$, the i-th sub-field corresponds to data of an (i−1)-th bit, where i is an integer greater than or equal to 1 and less than or equal to N, and N is an integer greater than or equal to 2.

2. The control method of the backlight unit of claim 1, wherein the step of outputting the sub-fields having different durations corresponding to each of the partitions in the preset order comprises a following step:

outputting a first sub-field to an N-th sub-field sequentially, wherein in the i-th sub-field, the light-emitting unit inputs the data of the (i−1)-th bit corresponding to the i-th sub-field once, and outputs the i-th sub-field; and wherein data from the 0-th bit to the (N−1)-th bit is 0 or 1, when the data of the (i−1)-th bit is 1, the duration of the light-emitting unit corresponding to the i-th sub-field is in a light-emitting state, and when the data of the (i−1)-th bit is 0, the duration of the light-emitting unit corresponding to the (i−1)-th sub-field is in a dark state.

3. The control method of the backlight unit of claim 1, wherein each the light-emitting unit comprises a charging unit, a driving unit, an energy storage unit, and a plurality of light-emitting elements connected in series;

the charging unit is electrically connected to the driving unit and the energy storage unit, and is configured to write a data signal to the energy storage unit according to a scan signal;

the driving unit is electrically connected to the energy storage unit and the light-emitting elements connected in series, and is configured to drive the light-emitting elements connected in series to operate under a control of the energy storage unit; and the energy storage unit is configured to store the data signal and control an operation of the driving unit according to the data signal.

4. The control method of the backlight unit of claim 1, wherein the step of obtaining backlight data corresponding to each of the partitions comprises a following step:

obtaining the backlight data of each of the partitions from a time controller or a field programmable gate array.

5. A backlight unit, comprising a plurality of partitions and each of the partitions arranged with a light-emitting unit, wherein the backlight unit comprises:

an obtaining unit configured to obtain backlight data corresponding to each of the partitions, the backlight data comprising multiple bits of data;

a dividing unit configured to divide a frame of a lighting process of each light-emitting unit of the partitions into a plurality of sub-fields each having different durations, wherein each of the sub-fields corresponds to one of the bits of data; and an output unit configured to output the sub-fields each having different durations corresponding to each of the partitions in a preset order;

wherein the dividing unit is configured to divide the frame of the lighting process of each light-emitting unit of the partitions into N sub-fields each having different durations, wherein a ratio of a duration of an i-th sub-field to a total duration of the N sub-fields is $2^{i-1}/(2^N-1)$, the backlight data comprises data from a 0-th bit to an (N−1)-th bit, the i-th sub-field corresponds to data of an (i−1)-th bit, where i is an integer greater than or equal to 1 and less than or equal to N, and N is an integer greater than or equal to 2.

6. The backlight unit of claim 5, wherein the output unit is configured to output a first sub-field to an N-th sub-field sequentially, wherein in the i-th sub-field, the light-emitting unit inputs the data of the (i−1)-th bit corresponding to the i-th sub-field once, and outputs the i-th sub-field; and wherein data from the 0-th bit to the (N−1)-th bit is 0 or 1, when the data of the (i−1)-th bit is 1, the duration of the light-emitting unit corresponding to the i-th sub-field is in a light-emitting state, and when the data of the (i−1)-th bit is 0, the duration of the light-emitting unit corresponding to the (i−1)-th sub-field is in a dark state.

7. The backlight unit of claim 5, wherein each the light-emitting unit comprises a charging unit, a driving unit, an energy storage unit, and a plurality of light-emitting elements connected in series;

the charging unit is electrically connected to the driving unit and the energy storage unit, and is configured to write a data signal to the energy storage unit according to a scan signal;

the driving unit is electrically connected to the energy storage unit and the light-emitting elements connected in series, and is configured to drive the light-emitting elements connected in series to operate under a control of the energy storage unit; and the energy storage unit is configured to store the data signal and control an operation of the driving unit according to the data signal.

8. The backlight unit of claim 5, wherein the obtaining unit is configured to obtain the backlight data of each of the partitions from a time controller or a field programmable gate array.

9. A liquid crystal display device, the liquid crystal display device comprising a backlight unit, the backlight unit comprising a plurality of partitions and each of the partitions arranged with a light-emitting unit, wherein the backlight unit comprises:

an obtaining unit configured to obtain backlight data corresponding to each of the partitions, the backlight data comprising multiple bits of data;

a dividing unit configured to divide a frame of a lighting process of each light-emitting unit of the partitions into a plurality of sub-fields having different durations, wherein each of the sub-fields corresponds to one of the bits of data; and an output unit configured to output the sub-fields each having different durations corresponding to each of the partitions in a preset order;

wherein the dividing unit is configured to divide the frame of the lighting process of each light-emitting unit of the partitions into N sub-fields each having different durations, wherein a ratio of a duration of an i-th sub-field to a total duration of the N sub-fields is $2^{i-1}/(2^N-1)$, the backlight data comprises data from a 0-th bit to an (N−1)-th bit, the i-th sub-field corresponds to data of an (i−1)-th bit, where i is an integer greater than or equal to 1 and less than or equal to N, and N is an integer greater than or equal to 2.

10. The liquid crystal display device of claim 9, wherein the output unit is configured to output a first sub-field to an N-th sub-field sequentially, wherein in the i-th sub-field, the light-emitting unit inputs the data of the (i−1)-th bit corresponding to the i-th sub-field once, and outputs the i-th sub-field; and wherein data from the 0-th bit to the (N−1)-th bit is 0 or 1, when the data of the (i−1)-th bit is 1, the duration of the light-emitting unit corresponding to the i-th sub-field is in a light-emitting state, and when the data of the (i−1)-th bit is 0, the duration of the light-emitting unit corresponding to the (i−1)-th sub-field is in a dark state.

11. The liquid crystal display device of claim 9, wherein each the light-emitting unit comprises a charging unit, a driving unit, an energy storage unit, and a plurality of light-emitting elements connected in series;

the charging unit is electrically connected to the driving unit and the energy storage unit, and is configured to write a data signal to the energy storage unit according to a scan signal;

the driving unit is electrically connected to the energy storage unit and the light-emitting elements connected in series, and is configured to drive the light-emitting elements connected in series to operate under a control of the energy storage unit; and the energy storage unit is configured to store the data signal and control an operation of the driving unit according to the data signal.

12. The liquid crystal display device of claim 9, wherein the obtaining unit is configured to obtain the backlight data of each of the partitions from a time controller or a field programmable gate array.

* * * * *